No. 701,461. Patented June 3, 1902.
W. H. BATES.
SPRING CUSHION AND ITS SUPPORT.
(Application filed Nov. 11, 1901.)

(No Model.) 2 Sheets—Sheet 1.

WITNESSES:
Harrie R. Brown.
Jennie M. Harper.

INVENTOR:
William H. Bates,
By Chester W. Brown,
his Attorney.

THE NORRIS PETERS CO., PHOTO-LITHO., WASHINGTON, D. C.

No. 701,461. Patented June 3, 1902.
W. H. BATES.
SPRING CUSHION AND ITS SUPPORT.
(Application filed Nov. 11, 1901.)
(No Model.) 2 Sheets—Sheet 2.
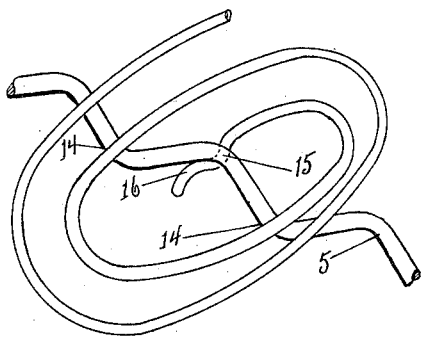
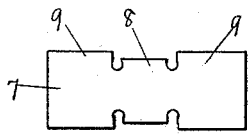 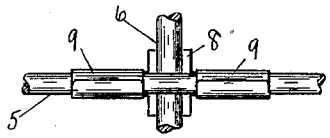 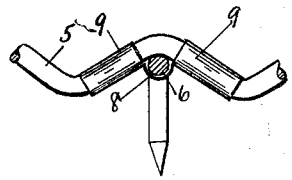
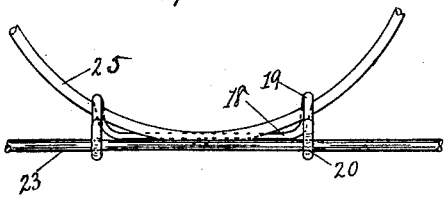
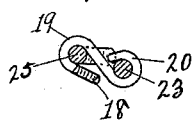 
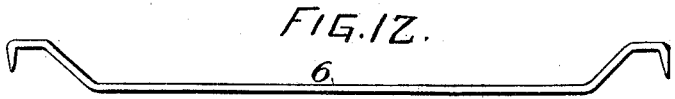
WITNESSES: INVENTOR:
Jennie M. Harper. William H. Bates,
Harrie R. Brown. By Chester W. Brown,
his Attorney.
THE NORRIS PETERS CO., PHOTO-LITHO., WASHINGTON, D. C.

UNITED STATES PATENT OFFICE.

WILLIAM H. BATES, OF JACKSON, MICHIGAN.

SPRING-CUSHION AND ITS SUPPORT.

SPECIFICATION forming part of Letters Patent No. 701,461, dated June 3, 1902.

Application filed November 11, 1901. Serial No. 81,789. (No model.)

*To all whom it may concern:*

Be it known that I, WILLIAM H. BATES, a citizen of the United States, residing at the city of Jackson, in the county of Jackson and State of Michigan, have invented certain new and useful Improvements in Spring-Cushions and Their Supports, of which the following is a specification.

My improvement relates to spring-cushions in which springs are supported upon supports extending across the frame; and the objects of my invention are, first, to provide a spring that may be easily and quickly placed upon corrugated support-wires at any corrugation therein; second, to provide the springs with means of holding themselves firmly upon said support-wires when once placed in engagement therewith; third, to provide means for attaching the support-wires together at their points of crossing; fourth, to provide means for attaching a wire to the upper coil of the springs to form a spring edge when desired, other objects and advantages being apparent from the following specification.

Figure 1:
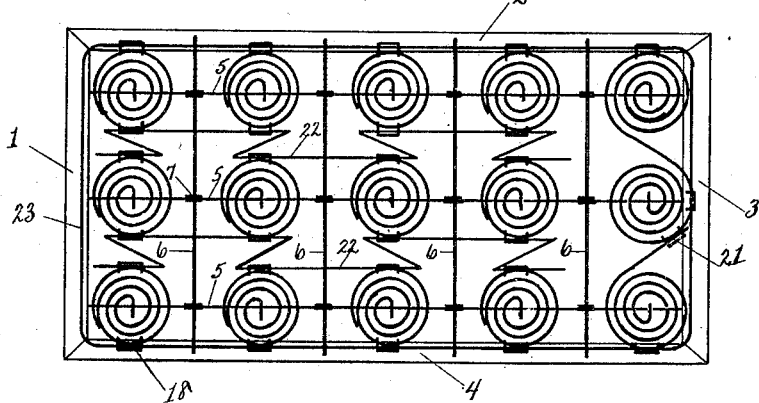
Figure 2:
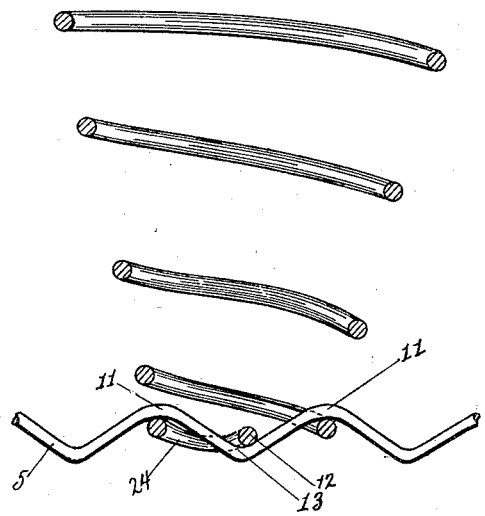
Figure 3:
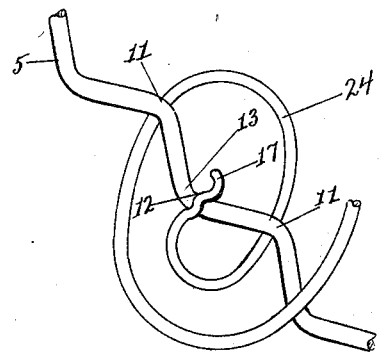
Figure 4:
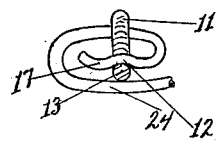

In the accompanying drawings, forming a part of this specification, Figure 1 is a top plan view of a spring-cushion, showing both double and single springs as adapted to my improvement and a wire attached to the edge of the springs and forming a spring edge. Fig. 2 is a section view of a spring, showing the position of the spring and lower coil and compound curve when in engagement with the corrugated support-wire. Fig. 3 is a projection of the lower coils of the spring and the support-wire, showing the method of attaching the spring to the support-wire. Fig. 4 is another section view showing the compound curve and its engagement with the corrugated support-wire. Fig. 5 is a projection of the lower coils and support-wire, showing a variation in the construction of the compound curve, in which the spring engages the support-wire on the upper side and the compound curve engages the corrugation on the under side. Fig. 6 is a plan view of the blank out of which the hasp is formed, holding the two support-wires together at their crossing. Fig. 7 is a plan view of the hasp and support-wires after the hasp is clamped thereabout. Fig. 8 is an elevation showing the hasp and support-wires with the hasp clamped thereabout. Fig. 9 is a top plan view of the wire holder and lock holding and locking the spring-edge wire to the upper coils of the springs, also showing broken portions of the spring-edge wire and the upper coil of the spring. Fig. 10 is an end view of the wire holder and lock, showing the positions of the wire forming the spring edge, the upper coil of the spring, and the holder before sprung into locked engagement. Fig. 11 is a view similar to Fig. 10, but showing the positions of the parts after the spring-edge wire is sprung past the upper coil of the spring and locked in engagement therewith. Fig. 12 is a view of the cross support-wire 6, showing the ends pointed.

In the drawings, Fig. 1 shows a frame for a carriage-cushion composed of the side pieces 1, 2, 3, and 4. Into these pieces are driven the sharpened and downwardly-turned ends of the cross support-wires 6 6. These cross support-wires are formed of straight wire throughout their horizontal portions and at their ends are bent downwardly and sharpened to be driven into the frame-pieces 2 4. The support-wires proper, 5 5, are constructed of corrugated or kinked wire and rest upon the cross support-wires 6 6. At the points of crossing the said support-wires are securely fastened to said cross support-wires by means of the hasp or clasp 7. This hasp is formed with the middle portion 8 hollowed or rounded to receive the cross support-wire 6, to the rounded shape of which it conforms, and the ends 9 9 are adapted to be bent closely about the corrugated support-wire upon each side of the point of crossing, as shown in Figs. 7 and 8, and hold the cross support-wire from slipping out of the corrugation or bend in which it is secured. The lower extremity of each of said springs is bent diametrically of the lowermost coil of said spring 24 and is formed into a compound curve, as shown in Figs. 3 and 4. In Fig. 3 the lowermost coil is constructed to engage with the lower side of the corrugations or bends at 11 11, while the extremity of the said spring is forced above the intervening downwardly-directed bend or corrugation, and the seat at 12, formed by the said compound curve, rests firmly upon the said support-wire. To obtain this result, the said seat at 12 is constructed in a plane below the upper side of the corrugation 13, into which it is to be forced, and the end of said wire is turned upward to facilitate the forcing of said end over the said support-wire. To place the said spring upon said support-wire, the lower convolution is placed in contact with the support-wire at the points 11 11, and the point of the spring is forced over the support-wire until the downwardly-directed bend therein at 17 has passed over the support-wire and the upwardly-directed bend at 12, forming the seat, rests upon the said support-wire. The recoil of the spring after passing over the support-wire holds the lowermost coil firmly against the under side of the support-wire and the seat in the spring firmly against the upper side of the support-wire, and the said downwardly-directed bend at 17 prevents the spring from becoming displaced or removed from said support by accident or from working loose in any manner, and also the spring-pressure which holds the said spring against said support-wire prevents any play or rattling of the spring in use. In Fig. 5 I have shown a variation in which the seat is formed by a downwardly-directed bend at 15, and the extremity is formed into an upwardly-directed bend at 16. This spring fits upon the support-wire in just the reverse position of that shown above, the lowermost coil being placed upon the upper side of the support-wire at 14 14 and the end 16 being forced underneath the support-wire until the seat 15 rests against the lower side of the support-wire, as shown. In this construction the end of the spring must be forced downward to place it upon said support-wire, and the recoil holds the seat firmly against the lower side and the lowermost coil of the spring against the upper side of the support-wire.

To fasten the spring-edge wire 23 to the upper coils of the springs 25, I use a piece of wire 18, having a middle portion of straight wire and each end thereof formed into a double loop at right angles to the middle portion thereof. The loop 19 holds the upper coil of the spring and is of such proportion that the straight middle portion of said holder contacts with the upper coil of the spring whenever it is raised. The loop 20 holds the wire forming the spring edge and is of such proportion that when the wire inclosed by it is raised it contacts with the upper coil of the spring, but may be sprung back far enough to pass by it, and then springs back to its original position on the upper side of the coil, and the middle portion 18 of the holder being in contact with the lower side of the said upper coil the wire forming the spring edge is held firmly thereagainst by the said recoil of the said spring-edge wire after passing the coil of the spring, and the said wire forming the spring edge can only be moved by first springing it downward past the said upper coil until it is in the first position, as shown in Fig. 10. In the same manner when it is desired to add a third row of springs in connection with double springs, as shown at the right of the cushion shown, the projecting end of the single spring is inserted in the loops 20 20 of the holder and lock and is locked in position with the upper coil of the next adjacent member of the double spring, as shown at 21.

When it is desired to use all single springs, as shown on the left-hand side of Fig. 1, the said springs are held in position by the ties 22 22 shown therein.

It will be seen from the foregoing description that either single or double springs may be used in the construction shown; that they may be placed in rows of two or more, as desired; that the support-wires are held firmly in position against movement and may be packed and shipped ready assembled to be attached to the frames by merely driving the points of the cross-supports into the frame; that the springs may be put on at any portion of the corrugated-wire support, and thus the support-wires do not require to be made especially for any particular style or number of springs. The springs are readily, easily, and quickly placed upon the supports, and when so placed cannot work loose or become separate from the supports, but may be quickly and easily removed by hand when so desired; that the points of the lower ends of the springs being turned upward instead of downward, as is required in some styles of construction, these points cannot mar or or scratch any object upon which they are placed and when packed one upon another do not injure the cover upon the under cushion. It is also noticeable that the wire edge may be readily and quickly inserted in the loops of the holder and lock when it is in the position shown in Fig. 10, but when sprung upward and locked, as shown in Fig. 11, is held firmly against loosening or movement until unlocked. It will also be readily seen that the said holder and lock for the wire forming the spring edge may be used in any place where it is desired to secure a straight piece of wire to a curved wire, as on the bottom of a cushion, where the lowermost coil is large, like the top one, and it is desired to have a wire for a spring edge at the bottom also. It is also apparent that the hasp used to fasten the support-wires together may be used at any place where it is desired to attach a corrugated wire to a crossing straight wire at their point of crossing.

Having thus described my invention, what I claim, and desire to secure by Letters Patent, is the following:

1. The combination with support-wires having straight middle portions, of corrugated wires crossing the same at right angles, and firmly joined thereto at their points of crossing, and conical, convolute springs having their lowermost coils in spring contact with, and on the under side of upwardly-directed bends of said corrugated wire, and the ends of said springs turned inwardly diametrically of said coils, and in a plane below the same, and formed into a compound curve, with the upwardly-directed bend in spring contact with, and on the upper side of a downwardly-directed bend of said corrugated wire intermediate the corrugations engaged by said lowermost coils.

2. The combination with support-wires having straight middle portions, corrugated wires crossing the same, sheet-metal hasps having a middle portion rounded to form a seat for said support-wires, and its ends bent at an angle to conform to the angle of the bend of the corrugated wire, and folded thereabout on either side of the point of crossing; double conical convolute springs, and single conical convolute springs having the lowermost ends thereof formed into a compound curve diametrically of, and in a plane below the lowermost coils thereof, to hold the spring upon the corrugated wires by the torsion and recoil after forcing said end over the corrugated wire, with the lowermost coil in contact with the opposite side thereof; and wire-clips to hold the upper ends of the single springs to the double springs, formed of a substantially straight middle portion, with double loops at each end, one set to hold the double spring, and the other to hold the end of the single spring firmly in contact therewith.

3. The combination with a seat-frame, of support-wires having straight middle portions and means at the ends for fastening the same to the said frame; corrugated cross-wires joined thereto at their points of crossing; springs formed at their lower ends into a compound curve to facilitate the forcing of said end over the corrugated wire, and also to form a seat to rest upon said corrugated wire to prevent the spring slipping therefrom, the spring being held firmly thereon by the recoil of the said spring at its lower end; a wire 23 to form a spring edge at the upper portions of said springs, and wire-clips having a straight middle portion in contact with the upper coils of said springs, and a double loop at each end to hold the said wire 23 firmly in contact with said top coils of said springs.

4. In a spring-seat, the combination with suitably-supported rows of single springs, of a tie-wire 22 adjacent to the uppermost coils of said spring, having a straight portion contiguous to said springs, and bent to connect with alternate rows, as shown, and wire-clips joining the straight portions of said tie-wire to the uppermost coils of said springs, each of said clips having a comparatively straight middle portion, a loop at each end coiled about the uppermost coil of said spring, and a second loop at each end adjacent to said first loops coiled about the said wire, and holding said tie-wire firmly against said spring, substantially as shown.

5. As a new article of manufacture, a wire-clip for springwork, having a straight middle portion, a loop at each end coiled about one wire, and a second loop at each end coiled about another wire, to connect said wires together.

6. As a new article of manufacture, a wire-clip for connecting a straight wire to a curved wire, consisting of a straight middle portion; a loop at each end coiled about said curved wire and a second loop at each end coiled about said straight wire, clamping the said two wires together.

7. As a new article of manufacture, a wire-clip for joining springs together, or to stay or tie wires, consisting of a comparatively straight portion in contact with said spring; a portion coiled about said spring on either side of said middle portion; a second portion coiled about the other spring or wire which it is desired to be attached to said first spring.

8. As a new article of manufacture, a wire-clip for springwork consisting of a comparatively straight middle portion 18 in contact with a spring; a coil on either side of said middle portion joining said middle portion to said spring; and a second coil on either side of said middle portion joining a second wire to said middle portion, and also to said spring.

9. As a new article of manufacture, a wire-clip for springwork, consisting of a straight middle portion 18, a loop 19, at either end at right angles to said middle portion, for engaging a spring; and a second loop 20, at each end of said clip, and at right angles to said middle portion, for engaging another wire which is desired to be attached to said spring.

In testimony whereof I have hereunto set my hand this 21st day of October, 1901.

WILLIAM H. BATES.

Witnesses:
R. D. KNOWLES,
JOHN C. BOUGHAN.